United States Patent [19]

Dunn et al.

[11] Patent Number: 5,112,579
[45] Date of Patent: May 12, 1992

[54] CONTINUOUS CARBOTHERMAL REACTOR

[75] Inventors: David A. Dunn; Michael S. Paquette, both of Midland, Mich.; Henry Easter, Atkins; Roger K. Pihlaja, Russellville, both of Ark.

[73] Assignee: The Dow Chemical Company, Midland, Mich.

[21] Appl. No.: 626,648

[22] Filed: Dec. 12, 1990

Related U.S. Application Data

[62] Division of Ser. No. 447,310, Dec. 7, 1989, Pat. No. 4,983,553.

[51] Int. Cl.$^5$ .............................................. B01J 8/02
[52] U.S. Cl. .................................. 422/198; 422/199; 422/232; 422/233; 422/239
[58] Field of Search ............... 422/199, 198, 202, 204, 422/232, 233, 237, 238, 239; 34/206; 202/117; 432/126, 137; 501/96, 97, 98; 423/412, 439; 35/58; 264/61, 66

[56] References Cited

U.S. PATENT DOCUMENTS

| | | | |
|---|---|---|---|
| 1,103,092 | 7/1912 | Serpec | 423/412 |
| 1,241,834 | 10/1917 | Duncan | 423/412 |
| 1,274,797 | 8/1918 | Shoeld | 423/412 |
| 1,305,414 | 6/1919 | Synder | 423/412 |
| 1,317,625 | 9/1919 | Huff | 202/117 |
| 1,496,054 | 6/1924 | Illingworth | 202/117 |
| 1,522,985 | 1/1925 | Taff | 202/117 |
| 1,668,132 | 5/1928 | Trent | 202/117 |
| 1,781,613 | 11/1930 | Trent | 202/117 |
| 2,335,611 | 11/1943 | Pray | 402/117 |
| 2,703,749 | 3/1955 | Herndon | 422/233 |
| 2,899,189 | 8/1959 | Matis | 432/137 |
| 2,962,359 | 11/1960 | Perieres et al. | 423/412 |
| 3,028,226 | 4/1962 | Wendell | 422/232 |
| 3,032,398 | 5/1962 | Clair | 423/412 |
| 3,092,455 | 6/1963 | Paris et al. | 423/412 |
| 3,129,933 | 4/1964 | Cremer et al. | 422/137 |
| 3,248,171 | 4/1966 | Nobel et al. | 423/412 |
| 3,343,920 | 9/1967 | Lowe | 422/199 |
| 3,398,058 | 8/1968 | Campbell | 202/117 |
| 3,964,892 | 9/1969 | Bennett | 202/117 |
| 3,971,705 | 7/1976 | Norita et al. | 202/117 |
| 3,997,001 | 3/1977 | Leighton | 432/137 |
| 4,113,435 | 9/1978 | Lagow et al. | 422/202 |
| 4,308,034 | 12/1981 | Hoang | 202/117 |
| 4,403,953 | 9/1983 | Suzuki | 432/126 |
| 4,618,592 | 10/1986 | Kuromoto | 501/96 |
| 4,722,768 | 2/1988 | Schirrmacher et al. | 422/233 |
| 4,784,839 | 11/1988 | Bachelard et al. | 423/412 |
| 4,818,511 | 4/1989 | Nishi et al. | 423/412 |

FOREIGN PATENT DOCUMENTS

| | | | |
|---|---|---|---|
| 0077111 | 5/1985 | Japan | 423/412 |
| 2032172 | 2/1987 | Japan | 202/117 |
| 2278110 | 12/1987 | Japan | 501/96 |
| WO90/01340 | 2/1990 | PCT Int'l Appl. | 402/199 |
| 11091 | of 1913 | United Kingdom | 423/412 |

Primary Examiner—Peter Kratz
Attorney, Agent, or Firm—D. R. Howard

[57] ABSTRACT

A reactor for carbothermal reduction is disclosed. By supplying gaseous nitrogen throughout a discrete aliquot of a preferably pelletized mixture of aluminum oxide, carbon and, optionally, calcium oxide during the carbothermal reduction thereof to aluminum nitride and continuously removing gaseous reaction products therefrom, a high quality aluminum nitride is produced. One means of supplying gaseous nitrogen to the mixture of solid reactants is a perforated tray having a hollowed-out bottom. Gaseous nitrogen supplied to the hollowed-out portion flows through the perforations and throughout solid reactants contained in the tray. The carbon may be alternatively supplied, in whole or in part, as a gaseous reactant.

9 Claims, 2 Drawing Sheets

CONTINUOUS CARBOTHERMAL REACTOR

This is a divisional of application Ser. No. 07/447,310, filed Dec. 7, 1989 and now U.S. Pat. No. 4,983,553.

BACKGROUND

The present invention concerns an improved method for preparing aluminum nitride powders. The present invention also concerns an apparatus suitable for use in conjunction with the improved method.

Aluminum nitride exhibits certain physical properties which make it particularly suitable for use in a variety of applications. Some applications, e.g., packaging components for electronic circuitry, require substantially full theoretical density and high thermal conductivity. High quality aluminum nitride powder, when densified by sintering, hot-pressing or other suitable means, generally satisfies these requirements. A number of factors contribute to powder quality. Powder particle size and surface area primarily affect density of the resultant ceramic article. Powder purity plays a major role in determining purity of the resultant ceramic and thereby the magnitude of certain physical properties such as thermal conductivity.

High quality aluminum nitride powder typically has a low oxygen content (less than about 2%), a low carbon content (less than about 0.2%), and low trace metals content (less than a few hundred parts per million). Lower quality aluminum nitride powders, e.g., those with greater oxygen, carbon or trace metals contents, are generally regarded as unsuitable for use in certain electronics applications such as electronic packaging. Sinterable aluminum nitride powders typically have a particle size of from 1.0 to 0.2 micrometers inclusive. The surface area of the powders, being inversely proportional to the particle size, ranges from about 2 to 10 $m^2/g$ inclusive.

Production of aluminum nitride powder typically follows one of two known methods. One method, known as direct nitridation, involves nitriding of metallic aluminum nitride powder in a nitrogen or ammonia atmosphere at high temperature and pulverizing the resultant nitride. The second method, known as carbothermal reduction, reacts aluminum oxide, carbon and nitrogen at a high temperature. The present invention focuses upon the latter method.

An examination of the carbothermal reduction reaction thermochemistry shows that it has a highly endothermic nature under all conditions. As such, heat must be supplied in an effective and efficient manner if the reaction is to proceed at an acceptable velocity. Adverse effects of an improper supply of heat include an incomplete reaction of starting materials, coarsening or grain growth of the aluminum oxide starting material or the aluminum nitride product or both, and undesirable side reactions to form unwanted byproducts such as aluminum oxynitride.

Complete conversion of the reactants requires both an effective introduction of reactant gases, e.g., nitrogen, into the reacting mass and an efficient removal of product gases such as carbon monoxide therefrom. If reactant gas introduction and product gas removal are not done properly, the resultant aluminum nitride product can contain high levels of oxygen. Excess oxygen indicates that the reaction has achieved an equilibrium position between starting materials and products which lies short of complete conversion to the desired aluminum nitride.

Kuramoto et al. (U.S. Pat. No. 4,618,592) teach the importance of choosing and maintaining high purity in the reactant solids, e.g., aluminum oxide and carbon. They also teach the importance of preparing an intimate mixture of the reactant solids. Their Example 1 discloses a small (30 to 200 gram) scale reaction in an electric furnace operating at about 1600° C. while feeding nitrogen gas into the furnace at a rate of 3 liters per minute. Following a reaction time of 6 hours, the mixture is removed and oxidized in air to remove unreacted carbon.

Reaction conditions suitable for use in conjunction with a laboratory scale reactor may not provide acceptable results in a larger scale apparatus. A small reacting mass allows for relatively efficient gas and thermal transport which, in turn, lead to preparation of high quality powders even under far less than ideal conditions. As the size of the reaction vessel increases to accommodate larger reacting masses, degradation of gas and thermal transport efficiency usually follows. As the depth of a bed of reactant solids increases, difficulties in providing contact between reactant solids and reactant gases and removal of product gases change from minor irritants to major problems. As the bed of reactant solids increases in size, heating of the bed to drive the endothermic reaction toward completion becomes increasingly non-uniform and varies with the distance of a portion of the bed from the source of heat. In other words, the reaction proceeds from the outside of the reactant bed or charge toward its center in response to an external source of heat. The foregoing gas and thermal transport problems give rise to less than ideal reaction conditions in local volumes within a reacting mass and consequent variability in aluminum nitride conversion and quality.

Design and operation of a reactor or process to provide near ideal reaction conditions in the reacting mass, while necessary, are not sufficient for a successful scale-up of aluminum nitride synthesis to industrial scale. Other factors, including raw materials, labor and utilities, must be managed efficiently in order to manufacture a competitive product.

Although operation of a continuous reactor or process may provide a cost effective use of utilities and labor, it also necessarily implies motion or moving parts. The design and operation of a reactor with hot moving parts is limited by the availability and performance of suitable materials. Addressing this limitation, while necessary, may give rise to other problems such as unacceptable loss of reaction control and product quality.

A number of references describe reactors and processes for preparing aluminum nitride. Some suggest the potential for industrial scale reaction of aluminum oxide with carbon and nitrogen. Others address reaction scale without reference to the product quality. Although a few references bring up the need for complete conversion of reactants to a product containing low oxygen, none address industrial scale facilities and processes for preparing high quality aluminum nitride having both low oxygen and fine particle size. Indeed, references which stress scale and product oxygen content necessarily preclude attainment of a fine particle size material.

Kuramoto et al., supra, disclose a process which prepares high quality powder. The process is not, however, suitable for practice on an industrial scale. Static beds of powdered solid reactants are impractical for large scale operations due to problems with product quality and uniformity and uneconomical reaction kinetics. Reaction times of six hours or more are clearly excessive.

Serpek (U.S. Pat. No. 888,044) discloses a method of producing aluminum nitride which consists of heating a mixture of alumina, carbon and a metal capable of forming an alloy with aluminum in a nitrogenous atmosphere to red heat. The resultant product quality is less than desirable because of contamination due to retained metal.

Serpek (U.S. Pat. No. 1,030,929) teaches the use of an electric furnace in which raw material powder mixtures are introduced into a rotary reaction chamber heated by resistance elements. Conversion of the mixtures to aluminum nitride is assisted by a counter flow of gaseous nitrogen. The rotary action of the chamber provides necessary agitation of the powder mixtures. This facilitates both gas and thermal transport. However, it also leads to unacceptable mixing of unreacted, partially reacted and fully reacted materials. If the reactor is operated at feed rates and residence times sufficient to fully convert all of the unreacted materials in such a mixture, the resultant material is still not uniform. The lack of uniformity translates to an unacceptable product.

Serpek (U.S. Pat. No. 1,078,313) teaches incorporation of hydrogen into the nitrogenous reaction atmosphere to induce somewhat faster initial reaction kinetics. However, the best product shown in the examples contains only 8.6 percent nitrogen, an indication of a conversion of approximately 30 percent.

Shoeld (U.S. Pat. No. 1,274,797) teaches a process for producing aluminum nitride which utilizes a vertically situated reaction zone through which briquets of aluminum oxide and carbon and a binder are passed while a nitrogen containing gas is uniformly distributed within. The reacting mass is heated by means of electrodes which cause current to pass through the briquets, heating each directly and uniformly. The configuration and operation of this process places severe demands upon the composition and physical properties of the feed briquets and on the partially and completely reacted briquets as well. In order for the briquets to pass electricity, the composition must be precisely tailored to provide the correct resistance. Unfortunately, the resistance clearly changes in an unpredictable fashion as the material is reacted. This unpredictability leads to inefficient heating of the reacting mass which, in turn, leads to variable reaction kinetics and nonuniform product quality. In addition, a vertical deep bed of briquets places severe constraints on briquet strength. The briquets must have both high unreacted strength and sufficient strength during conversion to avoid disintegration and consequent blinding of the column to flow of gaseous nitrogen. High strength is usually provided by incorporation of large amounts of binder or by the preparation of a denser material. Large amounts of binder compromise the purity of the product or change the course of the reaction whereas denser feed briquets inhibit the necessary gas transport within the briquet resulting in longer reaction times or lower product quality or both.

Perieres et al. (U.S. Pat. No. 2,962,359) teach the importance of maintaining effective control of the atmosphere in flow and composition in all portions of the reacting mass including the volume within individual porous briquets. The briquets consist of aluminum oxide and aluminum oxide in admixture with coke. Perieres et al. also teach the existence of volatile solid byproducts which can clog the reactor and otherwise alter the reaction's critical stoichiometry.

Clair (U.S. Pat. No. 3,032,398) discloses a process for continuously producing aluminum nitride. The process comprises forming a particulate feed material composed of aluminum oxide, carbon and a calcium aluminate binder: continuously passing the particulate material downward into an externally heated elongated reaction zone: passing a countercurrent flow of nitrogen through the descending particulate material: and removing and recovering the aluminum nitride below the reaction zone. The exhaust gases are conducted through an expansion zone to condense any calcium contained in the gases. The volatilized calcium compounds, if not removed, would otherwise clog the reactor. Some calcium remains in the product and represents an undesirable impurity. The binder also causes excessive sintering of particulate material thereby preventing recovery of a fine particle size product. Because nitrogen is consumed in the reaction and carbon monoxide is released, the elongated reaction zone with its axial flow of gas necessarily contains a non-uniform reaction atmosphere. In addition, the mechanical nature of the particulate flow within a stationary tube results in a nonuniform distribution of particle velocities leading to an uncertain residence time. Furthermore, countercurrent gas typically flows via channels within a deep or elongated bed. Such flow patterns contributes to production of a nonuniform product.

Paris et al. (U.S. Pat. No. 3,092,455) disclose a process for producing aluminum nitride wherein aluminum oxide grains are contacted with a reactant gas containing a hydrocarbon as a source of carbon. The process may be used in conjunction with a fixed bed reactor, a moving bed reactor, or a fluidized bed reactor. The introduction of a hydrocarbon into a fixed or moving bed of aluminum oxide grains, in either a co-current or a countercurrent flow, results in a nonuniform distribution of carbon, a critical reactant. The resultant product is expected to be similarly nonuniform. The fluidized bed typically provides for rapid and uniform mixing of the solid and gaseous reactants. However, continuous operation of a fluidized bed mandates continuous removal of product. The product so removed contains a finite, but undesirable, amount of unreacted and partially reacted solids.

SUMMARY OF THE INVENTION

One aspect of the present invention is a method for continuously producing aluminum nitride via carbothermal reduction of aluminum oxide. The method comprises:

a) providing at least one discrete aliquot of solid reactant materials, each aliquot being disposed within a separate container, each container having defined therein a means for receiving gaseous reactants and distributing said gaseous reactants in a generally uniform manner throughout said aliquot, said solid reactants comprising aluminum oxide and, optionally, carbon, said gaseous reactants comprising nitrogen and, optionally, a source of carbon:

b) passing the container(s) at least once through a heated reaction zone at a rate and for a period of time sufficient to heat said aliquot to a temperature sufficient to initiate a reaction between the gaseous reactants and solid reactant materials to produce aluminum nitride:

c) supplying the gaseous reactants to said container at a rate sufficient to convert the solid reactant materials to aluminum nitride:

d) removing gaseous reaction products from the solid reactant materials at a rate sufficient to form aluminum nitride with a controlled particle size and substantially preclude formation of aluminum oxynitride or aluminum oxycarbide.

The solid reactants are suitably in a form which maximizes contact with gaseous reactants and removal of reactant gases. The actual form is immaterial and may be selected from the group consisting of powder, flakes, pellets, agglomerates and the like. The solid reactants are desirably in the form of pellets.

A second aspect of the present invention is an apparatus comprising:

a) means for containing solid reactant materials, said means including a means for receiving gaseous materials and distributing said gaseous materials throughout any solid reactant materials contained therein:

b) means for conveying said container means at least once through a reaction zone:

c) means for supplying gaseous materials to the means for receiving gaseous materials said container means while the container means are conveyed through the reaction zone; and d) means for removing gaseous reaction products from the reaction zone.

The method and apparatus of the present invention suitably produce high quality aluminum nitride powder on a commercial scale. The resultant aluminum nitride beneficially has an oxygen content equal to or less than about 1.5% by weight, a particle size of equal to or less than about 1.5 microns and a specific surface area of between about 2 $m^2$/gms and about 5 $m^2$/gms. Sintered aluminum nitride formed from aluminum nitride powder prepared by the method and apparatus of the present invention can be of near theoretical density with a thermal conductivity in excess of about 140 W/m° K.

The above features and other details of the invention, either as steps of the invention or as combinations of parts of the invention, are more particularly described with reference to the accompanying drawings and pointed out in the claims.

Particular embodiments of the invention are shown by way of illustration only and not as a limitation of the invention. Principal features of the invention may be employed in various embodiments without departing from the scope of the invention.

DETAILED DESCRIPTION OF THE INVENTION

Figure 1:
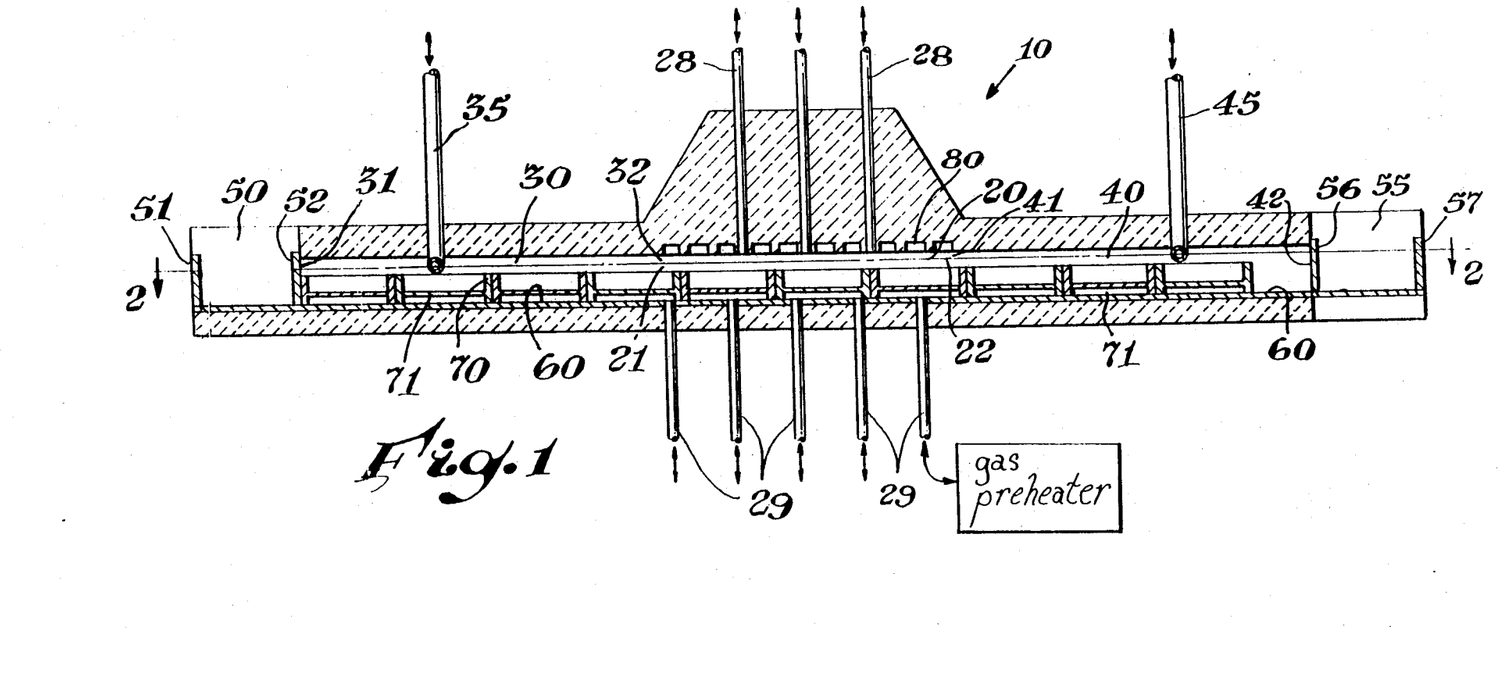
FIG. 1 is a cross-sectional side view of a schematic illustration of one embodiment of the apparatus of the present invention
Figure 2:
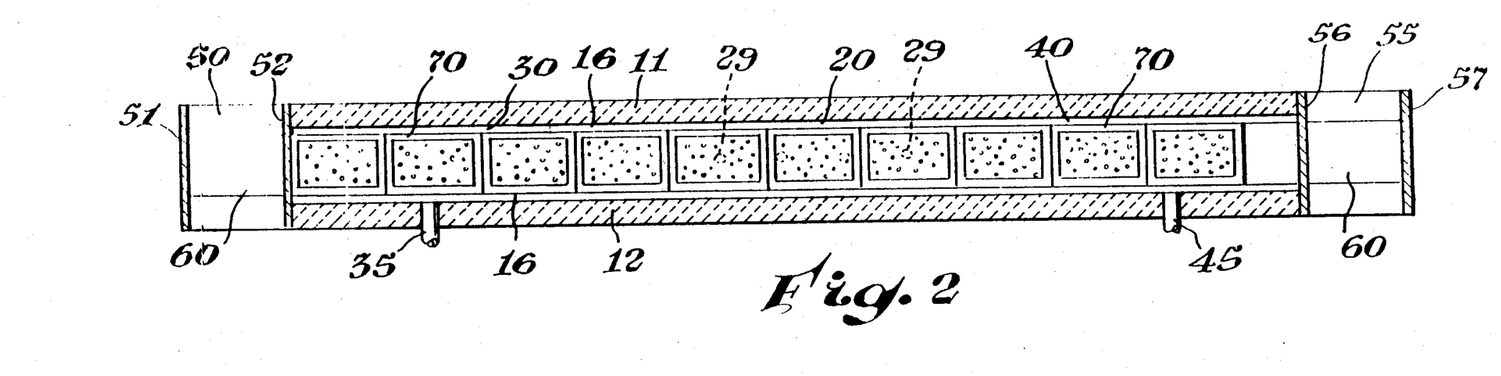
FIG. 2 is a cross-sectional plan view taken along line 2—2 of FIG. 1.

FIGS. 1 and 2 schematically depict an apparatus suitable for purposes of the present invention and designated by the reference numeral 10. The apparatus 10 comprises a reaction chamber 20, a plurality of upper reaction chamber conduits 28, a plurality of lower reaction chamber conduits 29, a first tunnel chamber 30, a first tunnel chamber conduit 35, a second tunnel chamber 40, a second tunnel chamber conduit 45, a first air lock 50, a second air lock 55, a container support means (rail, track, path or channel) 60, a plurality of container means, boats or trays 70, a plurality of heating elements 80, a means (not shown) of moving said container means 70 along track 60, a source of reactant gases (not shown) and a means for receiving gaseous reaction products (not shown).

The first tunnel chamber 30 has a first end 31 located proximate to, and in operative communication with, the first air lock 50 by way of inner air lock door 52 and a second end 32 located remote from the first end 31 and proximate to, and in fluid communication with, first end 21 of reaction chamber 20. The first tunnel chamber conduit 35 is connected to, and in fluid communication with, the first tunnel chamber 30.

The second tunnel chamber 40 has a first end 41 located proximate to, and in fluid communication with, second end 22 of reaction chamber 20, and a second end located remote from the first end 41 and proximate to, and in operative communication with, the second air lock 55 by way of inner air lock door 56. The second tunnel chamber conduit 45 is connected to, and in fluid communication with, the second tunnel chamber 40.

The reaction chamber 20 has disposed therein the heating elements 80. The heating elements 80 are arrayed in a manner sufficient to impart heat to contents of container means 70 as said means traverse reaction chamber 20. As shown in FIG. 1, heating elements 80 are arrayed above container means 70. That arrangement may be varied as desired to place the heating elements 80 proximate to the sides of, below, or all around said container means 70 while they are disposed within reaction 20.

The placement of heating elements 80 also fixes the first end 21 and the second end 22 of reaction zone 20. As shown in FIG. 1, the first end 21 is proximate to the heating element 80 located closest to the first air lock 50 and the second end 22 is proximate to the heating element 80 located closest to the second air lock 55.

If desired, the heat supplied by heating elements 80 may be supplemented by preheating reactant gases by a means before introducing them into reaction chamber 20. Sweep gases, if used, could also be preheated. Preheating apparatus and the operation thereof are known. Suitable preheat temperatures are readily determined without undue experimentation.

The upper reaction chamber conduits 28 are connected to, and in fluid communication with, reaction zone 20. The lower reaction chamber conduits 29 are connected to the rail, track, path or channel 60 in such a manner that the conduits 29 are in fluid communication with a lower portion of reaction zone 20. At least one of the conduits 29 is beneficially in fluid communication with a gaseous reactant receiving chamber 71 of each container means 70 while said container means 70 is disposed within reaction zone 20. As shown in FIG. 1, and more particularly in FIG. 4, the chamber 71 is suitably a hollowed out lower portion of container means 70. The edges of the hollowed out portion beneficially form a frictional seal with channel 60 sufficient to minimize loss of gaseous reactants (not shown) introduced into chamber 71 via one or more of conduits 29.

The first air lock 50 has an inner air lock door 52 located proximate to, and in operative communication with, the first end 31 of the first tunnel chamber 30 and an outer air lock door 51 located remote from the inner air lock door 52. The second air lock 55 has an inner air lock door 56 located proximate to, and in operative communication with, the second end 42 of second tunnel chamber 40 and an outer air lock door 57 located remote from the inner air lock door 56.

FIG. 2 shows a gap 16 between the sides of container means 70 and sides 11 and 12 of apparatus 10 which constitute the sides of reaction chamber or zone 20, the first tunnel chamber or zone 30 and the second tunnel chamber or zone 40. The gap 16 is not drawn to scale. In actual practice, gap 16 may be quite small where container support means 60 is merely a floor of apparatus 10 rather than a rail, track or defined path. The "small" gap minimizes side-to-side movement of container means 70 as they are moved respectively through first tunnel chamber 30, reaction chamber 20 and second tunnel chamber 40 or vice versa. Such a gap is readily determined without undue experimentation. If container support means 60 is a rail, track, channel or other defined path which restricts side-to-side movement of container means 70, the gap may be larger if desired.

Figure 3:
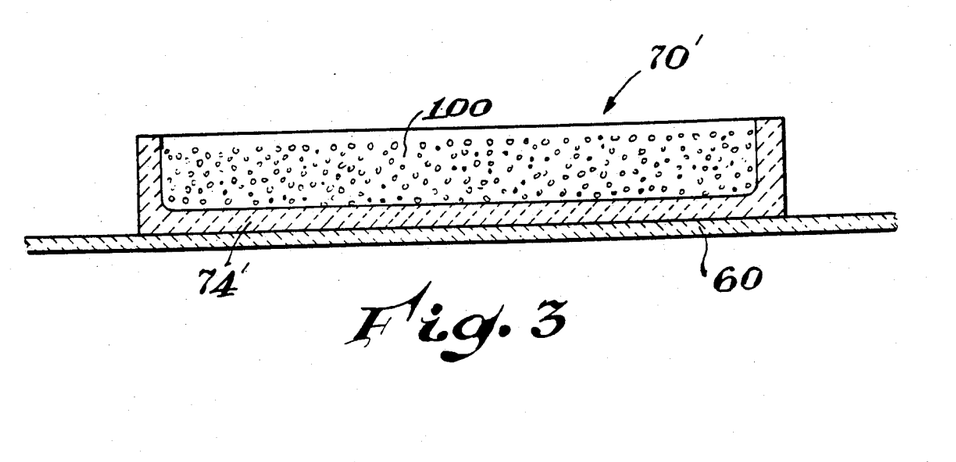
FIG. 3 is a cross-sectional side view of schematic illustration of a means for containing solid, finely-divided materials. The means is adapted to receive gaseous reactants by countercurrent flow thereof.

FIG. 3 is a cross-sectional schematic view of an alternate embodiment 70' of a container means 70. In L this embodiment, container means 70' has a solid bottom 74' with no chamber or hollowed-out portion 71 and holds a bed of solid reactant materials 100. Container means 70' beneficially moves along container support means 60 toward a flow of gaseous reactants (not shown). By way of illustration, container means 70', while moving along support means 60 from first air lock 50 (FIG. 1) to second air lock 55 (FIG. 1), would face a countercurrent flow of reactant gases (not shown) introduced via second tunnel chamber conduit 45 (FIG. 1) and exiting via first tunnel chamber conduit 35 (FIG. 1). If desired, the flow of reactant gases could be reversed to provide a co-current flow. As used herein, the term "co-current flow" means a parallel flow or a flow which proceeds in the same direction as container means 70 or 70'. In this embodiment, upper reaction chamber conduits 28 are used to introduce reactant gases (not shown) into apparatus 10. Reaction product gases (not shown) desirably vent through first tunnel chamber conduit 35 (countercurrent flow). In alternate embodiments, reaction product gases could be vented through second tunnel chamber conduit 45 for co-current flow or simultaneously through conduits 35 and 45 for a combination of countercurrent and co-current flow. One or more of conduits 28 (FIG. 1) can be used as sight ports for pyrometer temperature indicators (not shown). In this embodiment, lower reaction chamber conduits 29 (FIG. 1) may be omitted or closed off.

Figure 4:
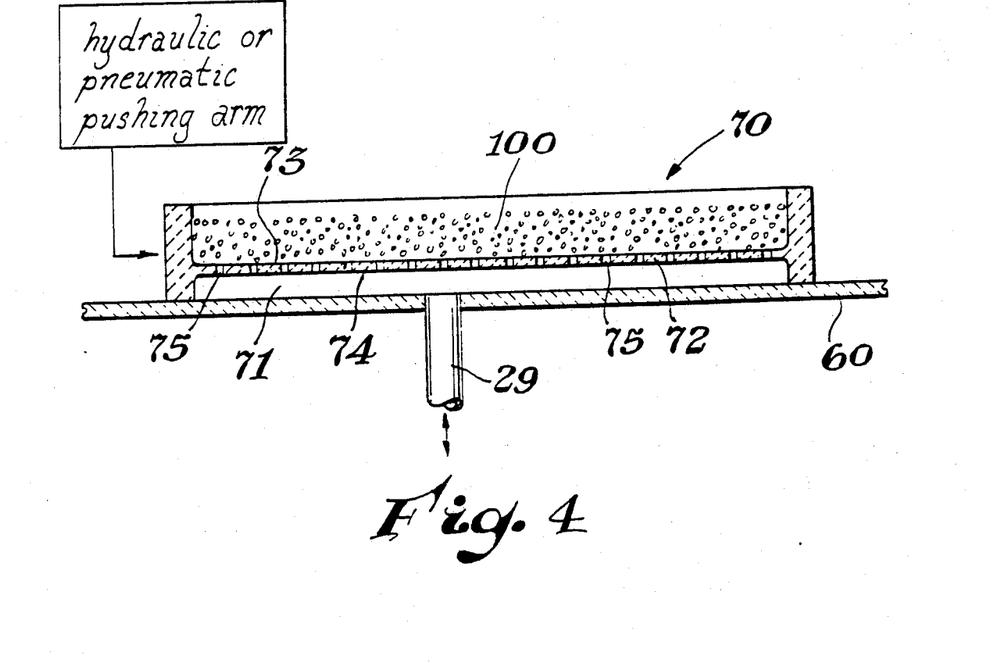
FIG. 4 is a cross-sectional side view of a schematic illustration of a preferred means for containing solid, finely-divided materials. The means is adapted to receive gaseous reactants via a porous bottom.

FIG. 4 schematically depicts, in cross-section, a preferred embodiment of container means 70 in conjunction with a partial sectional view of apparatus 10. In this embodiment, container means 70 has a hollowed-out chamber 71 configured so as to be in fluid communication with at least one lower reaction chamber conduit 29. Container means 70 has a porous floor 72. Floor 72 has an upper or solids receiving surface 73 and a lower or gaseous chamber surface 74. The lower surface 74 provides a top or ceiling for chamber 71. The floor 72 has defined therein a plurality of apertures or passageways 75 which are in fluid communication with both the chamber 71 and the solids receiving surface 73. In this manner, gaseous reactants (not shown) which enter chamber 71 via conduit 29 will exit chamber 71 via passageways 75 and be distributed throughout a bed of solid reactant materials 100 which is disposed on surface 73. Excess reactant gases and reaction product gases (not shown) may exit Apparatus 10 via first tunnel chamber conduit 35, second tunnel chamber conduit 45 upper reaction chamber conduits 28 or any combination thereof If desired, reactant gases or an inert sweep gas or an admixture of reactant gases and an inert sweep gas may be introduced into apparatus 10 via conduit 45, conduit 35 or conduits 28 so long as at least one of said conduits 35, 45 or 28 is used to exhaust or vent reaction product gases (not shown). In addition, one or more of lower reaction chamber conduits 29 may be used to vent excess reactant gases or reaction product gases so long as at least one of conduits 28, 29, 35 or 45 is employed to introduce reactant gases into reaction chamber 20. In other words, any combination of conduits may be used to add reactant gases to reaction chamber 20 and exhaust reaction product gases from apparatus 10 so long as at least one conduit is dedicated to each function.

A means for moving container means 70 along container support means 60 is suitably a hydraulic or pneumatic pushing arm. Other means of moving container means 70 from one end of apparatus 10 to the other end and, optionally, back again are readily discernible without undue experimentation The means for moving container means suitably conveys container means 70 or 70' sequentially from first airlock 50 through first tunnel chamber 30, reaction chamber 20, second tunnel chamber 40 and into second airlock 55. Each container means 70 beneficially contains a bed of solid reactant materials (see, e.g., bed 100 in FIGS. 3 and 4). The means for moving container means advances container means 70 or 70' through reaction chamber 20 at a rate sufficient to convert substantially all of said solid reactants into a desired reaction product The bed of solid reactant materials 100 is heated to a reaction temperature by heating elements 80 while container means 70 or 70' carrying said reactant materials are disposed within reaction chamber 20. Concurrent with heating, reactant gases (not shown) are conveyed from a source (not shown) via lower reaction chamber conduits 29, chamber 71 of container means 70 located above said conduits 29 and passageways 75 of said container means 70 through the bed solid reactant materials 100. Reaction product gases (not shown) and excess reactant gases (also not shown) are exhausted from reaction chamber 20 primarily via first tunnel chamber conduit 35. These gases may also be exhausted or vented through one or more of upper reaction chamber conduits 28, second tunnel chamber conduit 45 and lower reaction chamber conduits 29.

If a stream of reactant gases or inert gases (not shown) flows countercurrent from the second tunnel chamber conduit 45 to the first tunnel chamber conduit 35, or vice versa, some reaction product gases will also be swept from the reaction chamber 20 and out of either conduit 35 or conduit 45 as appropriate. As used herein, the term "inert gases" includes noble gases and other gases which do not react with solid or gaseous reactants under conditions employed to make a particular product, e.g., aluminum nitride, in apparatus 10.

If container means 70' are used in place of container means 70, reactant gases suitably flow as described in the immediately preceding paragraph. In this case, reactant gases will not enter reaction chamber 20 by way of conduits 29.

After container means 70 or 70' enter the second airlock 55, a number of options are available. First, container means 70 or 70' may be returned to first airlock 50 by reversing the direction of travel of the container means. This presumes the presence of a second container support means (not shown) as well as a means (also not shown) of moving said container means onto said second support means. A second option involves simply removing the reaction product from container means 70 or 70' and thereafter reusing said container means. A third option provides an additional passage of solid reactants through apparatus 10 as container means 70 or 70' are removed from second airlock 55 and conveyed by a suitable means (not shown) to first airlock 50. Variations of these options as well as other options are readily determined by those skilled in the art without undue experimentation.

Container means 70 and 70' and container support means 60 are suitably fabricated from graphite. Upper reaction chamber conduits 28 and lower reaction chamber conduits 29 may also be fabricated from graphite. The sides, top and bottom of first tunnel chamber 30, reaction chamber 20 and second tunnel chamber 40 suitably have a four layer structure consisting of an inner layer, a first intermediate layer, a second intermediate layer and an outer layer. The inner layer preferably consists of solid pieces of graphite. The first intermediate layer beneficially contains an insulating material to minimize loss of heat. A variety of insulation materials, including lamp black, and arrangements may be used. The second intermediate layer is desirably made from masonry materials with firebrick being particularly suitable for reaction chamber 20. The outer layer is desirably formed from steel or another suitable structural metal. In addition, other structural materials or features, such as additional intermediate layers, may be added without departing from the scope of the present invention.

Container means used in the following examples either have solid bottoms (70') for countercurrent or co-current configurations (FIG. 3) or perforated bottoms (70) for crosscurrent and combinations of crosscurrent, countercurrent, and co-current configurations (FIG. 4). Container means 70 and 70' are suitably 70 to 72 inches (177.8 to 182.9 centimeters) long by 9 inches (22.9 centimeters) wide by 3 to 4 inches (7.6 to 10.2 centimeters) tall. The actual dimensions are not particularly critical so long as container means 70 or 70' are compatible with mechanical or other means of moving said container means through the combined length of first tunnel chamber 30, reaction chamber 20 and second tunnel chamber 40 without undue difficulties such as those resulting from excess friction or too much play between the sides of container means 70 or 70' and the sides of chambers 20, 30 and 40. The bed of reactant materials 100 suitably has a depth of 0.25 inch (0.64 centimeter) to three inches (7.6 centimeters). If desired, a greater depth may be obtained with deeper container means 70 or 70'.

The particular form, size and physical properties of such a form of solid reactant materials is generally immaterial with a solid bottom container means 70' so long as the solid reactant materials are not swept from the container means by the flow of reactant gases. When using container means 70, the size or shape of solid reactant materials has an additional constraint in that it must be sufficient to substantially preclude loss of solid reactant materials through passageways 75 and subsequent interference with movement of the container means 70 along container support means 60. The solid reactant materials may, for example, be in the form of a powder or a shape selected from the group consisting of pellets, agglomerates, briquettes, tablets, granulates, extrudates or other suitable structure. The solid reactant materials are desirably in the form of pellets. Pellets may be formed by conventional technology, e.g., by extrusion, tabletting, granulation and the like.

Passageways 75 of container means 70 have two primary size constraints. First, they must provide enough open area to handle the anticipated flow of gaseous reactants, e.g., nitrogen, without so much backpressure that container means 70 are lifted, even momentarily, from track 60. Second, as noted hereinabove, they must not be so large that solid reactant materials easily fall therethrough. By way of illustration only, passageways having a diameter of 0.125 inch (0.32 centimeter) with a spacing of 0.625 inch (1.59 centimeters) center to center are used for the following examples. Other suitable sizes and spacing are readily determined without undue experimentation.

Hollowed-out chamber 71 is beneficially a 0.125 inch (0.32 centimeter) deep pocket cut out of the bottom surface of container means 70. The actual dimensions of Chamber 71 are not critical so long the chamber is large enough to handle the anticipated flow of gaseous reactants without causing excessive backpressure.

Heating elements 80 can be heated by flame, electrical elements, or by other heating means. Reaction chamber 20 is suitably heated to a temperature within a range of between about 1500° C. and 1900° C. for preparation of aluminum nitride. Other temperature ranges may be more suitable for other products. With such a temperature, container means 70 and 70' are suitably moved through apparatus 10 at a rate sufficient to provide adequate residence time, e.g. from about 0.25 to about 6 six hours. Illustrative rates vary from as low as 0.5 inches per minute to as high as 20 inches per minute. The actual rate will depend upon constraints such as residence time and size of reaction zone.

The spacing, number and arrangement of lower reaction zone conduits 29 are not particularly critical so long they supply sufficient gaseous reactant to the bed of solid reactant materials 100. Each container means 70 is suitably located over at least one conduit 29 while said container means 70 are situated within reaction zone 20. Accordingly, conduits 29 are beneficially spaced evenly within reaction zone 20. Other arrangements are, however, satisfactory.

The spacing, number and arrangement of upper reaction zone conduits 28, like those of lower reaction zone conduits 29, are not particularly critical. The conduits serve one or more of a number of functions including supply of reactant gases, venting of reaction product gases and providing access for instruments such as pyrometers. The functions desired for a particular process dictate actual quantities and spacing of such conduits.

Airlocks 50 and 55, while not shown to scale in FIGS. 1 and 2, are suitably of a size sufficient to hold, and provide access to, at least one container means 70 or 70'. Airlocks 50 and 55, particularly the latter, also serve as a cooling area. As such, the airlocks should either be large enough to serve that function or be connected to an auxiliary cooling or holding area of sufficient size to allow safe handling of said container means and their contents.

Aluminum nitride produced by the method and apparatus of the present invention beneficially has a specific surface area of between about 2 $m^2/gm$ and about 5 $m^2/gm$ Particle size of the aluminum nitride is suitably less than about 1.5 microns. Oxygen content is desirably about 1.5% by weight or less. Iron content within the aluminum nitride particles can be higher but is suitably less than about 35 ppm. The aluminum nitride particles desirably have a silicon content of less than about 250 ppm.

Residual carbon in the aluminum nitride product from apparatus 10 can be removed by exposing the product to air at a temperature of about 700° C. in an apparatus such as a rotary furnace.

The solid reactants which comprise the bed of solid reactant materials or reaction bed 100 are suitably those which yield the aluminum nitride described hereinabove. The solid reactants beneficially include aluminum oxide and carbon. The carbon is desirably present in an amount which is slightly (one to ten mole percent) in excess of the stoichiometric proportion to aluminum oxide so as to produce carbon monoxide gas during reaction of aluminum oxide with nitrogen gas. In terms of weight percent, based upon weight of solid reactant material wherein carbon is a solid reactant, a suitable amount is from about 24 to about 40 weight percent. The bed of solid reactant materials 100 may also comprise up to 1.5 weight percent of calcium oxide, which can act as a catalyst for production of aluminum nitride. Other sources or derivatives of calcium, as well as other materials which are known to function as catalysts for preparation of aluminum nitride, may be substituted for calcium oxide. In addition, sintering aids for subsequent densification of aluminum nitride may also be combined with the solid reactant materials One such sintering aid is yttria.

The solid reactants, aluminum oxide, carbon and, optionally, calcium oxide are suitably combined and formed into pellets prior to loading into container means or trays 70 or 70'. The solid reactants are beneficially dry-milled for about 4 hours and subsequently mixed with water and a binder to form an extrudable mixture. Suitable binders include, for example, polyvinyl alcohol, starch, methyl cellulose, and colloidal alumina, etc. The mixture is extruded into pellets which are beneficially of a size which facilitates the flow of reactant gases through reaction bed 100, does not substantially impede removal of gaseous reaction products from reaction bed 100, and minimizes, if not eliminates, plugging of passageways 75 of preferred container means 70. A suitable diameter is 0.25 inch (0.64 centimeter). The pellets are preferably oven-dried to remove substantially all of their water content prior to loading into container means 70 or 70'.

Instead of forming pellets, the solid reactants can be granulated to produce shapes of high porosity. The porous shapes provide sufficient reaction surface area for formation of aluminum nitride.

Reactant gases used in making materials with apparatus 10 are chosen to produce a desired reaction product. By way of illustration wherein the desired reaction product is aluminum nitride, reactant gases include nitrogen, mixtures of nitrogen and hydrogen, ammonia, mixtures of nitrogen or sources of nitrogen plus gaseous sources of carbon. Other potential sources of reactant gases are known to those skilled in the art.

The apparatus 10 is not restricted to production of aluminum nitride. It should also be suitable for use in producing other materials via carbothermal reduction wherein a gaseous reactant is placed in contact with solid reactants under conditions sufficient to produce the material One such reaction product is silicon nitride By way of illustration only, a suitable combined length of the first tunnel chamber 30, the reaction chamber 20 and the second tunnel chamber 40 is about 60 feet (18.5 meters), with the reaction chamber itself having a length of about eight feet (2.5 meters). First tunnel chamber 30, reaction chamber 20 and second tunnel chamber 40 each have a width of about 10 inches (25.4 centimeters) and a height of about six inches (15.2 centimeters). Trays 70 or 70' typically have dimensions as described hereinabove Depending upon factors such as rate of movement of trays 70 through the apparatus 10, the amount of solid reactants contained in said trays, the temperature of reaction zone 20 and the rate of flow of gaseous reactants, a production rate from such an apparatus is suitably three pounds per hour or more when the resultant product is aluminum nitride.

The following examples simply illustrate the present invention and are not to be construed, by implication or otherwise, as limiting the scope thereof All parts and percentages are by weight and all temperatures are in ° Celsius (° C.) unless otherwise stated.

EXAMPLE 1 AND COMPARATIVE EXAMPLE A

Using a 27 gallon (102.2 liter) mill containing one-half inch (1.3 centimeters) high density 99.5% alumina milling media, commercially available from Coors Ceramics Company, a 25 pound (11.4 kilogram) batch of the following raw materials is dry milled for 4 hours to prepare an aluminum nitride (AlN) precursor:

1. 72.0 weight percent alumina powder, commercially available from Aluminum Company of America under the trade designation Alcoa A16-SG: and 2. 28.0 weight percent acetylene carbon black, commercially available from Chevron Chemical Company under the trade designation Shawinigan acetylene black.

The alumina powder has a surface area of 9.46 square meters per gram. It has the following impurity levels in parts per million: calcium - 66: silicon - 53: chromium - less than 10: and iron - 80.

A portion of the AlN precursor powder is loaded into one solid bottom tray, hereinafter "Tray A", (see FIG. 3) at a depth of ½ inch (1.3 centimeter) to provide a total loading of two kilograms (Example 1). A second portion is loaded into another solid bottom tray, hereinafter "Tray B", at a depth of 1⅛ inches (2.8 centimeters) to provide a total loading of five kilograms (Comparative Example A). Because the trays have solid bottoms, there is no upflow of gaseous reactants via lower reaction zone conduits (see. FIG. 1). The trays are then pushed through a furnace having dimensions as detailed hereinabove (see also FIGS. 1 and 2) at a push rate sufficient to give a 96 minute reaction time at a maximum temperature of 1750° C. The reaction time is the estimated total time that the reactants are in a portion of the furnace that is at or greater than the minimum temperature at which the AlN reaction occurs (approximately 1500° C). A countercurrent nitrogen flow of 1,600 cubic feet (45.3 cubic meters) per hour is purged through the furnace while the trays are contained therein. Exhaust gases are vented through first tunnel chamber conduit 35 (see, FIG. 1) The trays contain, following completion of passage through the furnace's reaction zone, aluminum nitride. The resultant AlN product in each tray is sampled in six product bed locations (front top and bottom, middle top and bottom, back top and bottom) and analyzed for weight percent oxygen and surface area. The results are summarized in Table 1.

The oxygen content of the AlN product is used as an indication of reaction completeness. A product oxygen level above 1.5 percent is considered an indication, albeit not absolute, of a poorly converted product.

The data presented in Table 1 show that attempts to convert alumina powder to aluminum nitride powder in a thick bed (Tray B) result in much greater variability of product oxygen content as well as a larger range of resultant oxygen contents than similar attempts with a comparatively thin bed (Tray A). This is believed to be due to heat transfer and gas transport limitations inherent in thicker powder beds. All oxygen contents in Tray A save one are less than 1.5 percent. While this may indicate that a portion of the resultant powder may have an excessively high oxygen content, the

TABLE 1

| Tray | Sample Location | Weight Percent Oxygen | Surface Area m²/g |
|---|---|---|---|
| A | Front Top | 1.16 | 2.81 |
| A | Front Bottom | 1.20 | 2.92 |
| A | Middle Top | 1.39 | 2.93 |
| A | Middle Bottom | 1.27 | 3.10 |
| A | Back Top | 1.76 | 3.26 |
| A | Back Bottom | 1.36 | 2.93 |
| B | Front Top | 14.38 | 4.63 |
| B | Front Bottom | 8.30 | 2.79 |
| B | Middle Top | 2.78 | 3.52 |
| B | Middle Bottom | 7.87 | 3.23 |
| B | Back Top | 4.07 | 3.47 |
| B | Back Bottom | 8.89 | 2.75 | average oxygen content of aluminum nitride powder contained in that tray is clearly acceptable. Conversely, all oxygen contents in Tray B are clearly above, often considerably above, 1.5 percent. As such, the average oxygen content of powder contained in Tray B is also above such a desirable oxygen level.

EXAMPLE 2

Using the procedure and apparatus of Example 1, a 25 pound (11.4 kilogram) batch of aluminum nitride precursor powder is prepared from 71.7 percent of the same alumina as in Example 1, 28.0 percent of the same acetylene carbon black as in Example 1 and 0.3 percent calcium oxide.

The aluminum nitride precursor powder is mixed in a ribbon blender with 30% water and 5% polyvinyl alcohol. The resultant mixture is extruded into ¼ inch (0.6 centimeter) extrudates or pellets. The pellets are oven dried to a water content of less than 2.0%.

Solid bottom trays (see. FIG. 3) are loaded to a depth of 0.25 inch (0.6 centimeter) with the pellets to provide a total solid reactant charge of two kilograms. The density difference between pellets and powder accounts for a shallower depth of pellets to attain a particular loading. The trays are then pushed through the same furnace as in Example 1 at a rate sufficient to provide a 48 minute reaction time at 1750° C. maximum temperature. A countercurrent $N_2$ flow of 1500 CFH (42.5 cubic meters per hour) is used. The average oxygen content of the resulting AlN product is 1.26%.

COMPARATIVE EXAMPLE B

The process and composition of Example 2 is duplicated save for increasing the depth of pellets in the trays fourfold to one inch (2.54 centimeters).

The resulting AlN product has an average oxygen content of 20.6%. This indicates an unacceptably low conversion of alumina to AlN. The poor conversion is believed to result from a combination of mass transfer and heat transfer limitations.

The data presented in Example 2 and Comparative Example B show that pellets, like powder, provide a much more acceptable product in shallow bed than in a comparatively thick bed. As such, there is no significant difference in terms of oxygen content in using pelletized, rather than powdered, solid reactants in a solid bottom tray or container means.

EXAMPLE 3

Using a modified furnace wherein lower reaction zone conduits 29 (see, FIG. 1) are used to supply gaseous nitrogen to the hollowed-out chamber 71 of container means 70 (see, FIG. 4), the procedure of Example 2 is duplicated. Exhaust gases are vented through first tunnel chamber conduit 35 as in Example 1. The hollowed-out chamber is a ⅛ inch (0.3 centimeter) deep cavity routed out of the bottom of each tray. The cavity acts as a nitrogen distributor which evenly supplies nitrogen to ⅛ inch (0.3 centimeter) diameter holes which are spaced ⅝ inches (1.6 centimeter) from center to center across the entire floor of the tray. The conduits 29 are actually graphite tubes, each of which has an exit which is flush with the floor 60 of reaction zone 20 of the furnace. The depth of pellets in the trays is one inch (2.5 centimeters) as in Comparative Example B. Gaseous nitrogen flow through conduits 29 is at a rate of 1600 CFH (45.3 cubic meters per hour).

The average oxygen content of the resulting AlN product is 1.22%. The product has a surface area of 3.03 m²/gm. These results show a dramatic improvement in conversion over that obtained in Comparative Example B.

EXAMPLE 4 AND COMPARATIVE EXAMPLE C

AlN precursor pellets prepared as in Example 2 are loaded into a solid bottom tray (Comparative Example C) and a perforated bottom tray (Example 4) to a depth of 0.75 inch (1.9 centimeters). The solid bottom tray and the perforated bottom tray are identical, respectively, to those used in Examples 1 and 3. Each of the two trays is pushed through the apparatus at a rate sufficient to provide a reaction time of about 96 minutes with a maximum temperature of 1750° C. In the case of the perforated tray, gaseous nitrogen is supplied to the hollowed-out chamber, as in Example 3, at a rate of 1500 CFH (42.5 cubic meters per hour). The AlN product in each tray is sampled in 6 locations, as in Example 1, and analyzed for wt. % oxygen and surface area as determined from Brunauer, Emmet, Teller (B.E.T.) surface area analysis. The results are summarized in Tables 2 and 3.

TABLE 2

| | Solid Tray | |
|---|---|---|
| Sample Location | Percent Oxygen | Surface Area m²/gm |
| Front Top | 4.32 | 3.28 |
| Front Bottom | 11.08 | 2.99 |
| Middle Top | 1.25 | 3.11 |
| Middle Bottom | 1.44 | 2.88 |
| Back Top | 3.55 | 3.03 |
| Back Bottom | 7.93 | 2.98 |

TABLE 3

| | Perforated Tray | |
|---|---|---|
| Sample Location | Weight percent Oxygen | Surface Area m²/gm |
| Front Top | 1.24 | 2.99 |
| Front Bottom | 1.22 | 2.91 |
| Middle Top | 1.10 | 2.63 |
| Middle Bottom | 1.03 | 2.81 |
| Back Top | 1.04 | 2.70 |
| Back Bottom | 1.13 | 2.87 |

A comparison of the data presented in Tables 2 and 3 shows that the perforated tray (Example 4) produces a more uniform product quality than the solid tray (Comparative Example C). Because of the similarity of all factors other than the pattern of flow of gaseous nitrogen, the improved results are believed to follow from a more uniform distribution of the reaction gases. The reaction in the perforated tray also proceeds at a faster rate as evidenced by the lower oxygen values. The product sampled from the bottom layer on the solid tray shows early indications of product coarsening even though the precursor is not fully converted. This may be caused by an insufficient $N_2$ supply near the bottom of the bed with the solid tray.

Although preferred embodiments have been specifically described and illustrated herein, it will be appreciated that many modifications and variations of the present invention are possible, in light of the above teachings, within the purview of the following claims, without departing from the spirit and scope of the invention.

What is claimed is:

1. An apparatus for converting solid reactants to solid reaction products comprising:
   a) a tunnel having sides, a top and a bottom, the tunnel being apportioned along its length into three chambers, said chambers being respectively a first tunnel chamber, a reaction chamber and a second tunnel chamber, the first and second tunnel chambers being connected to, and in fluid communication with, opposed ends of the reaction chamber, said reaction chamber having disposed therein a plurality of heating elements arrayed in a manner sufficient to impart heat to contents of at least one of a plurality of solid reactant container means as said container means traverse the reaction chamber, the disposition of the heating elements serving to define opposing first and second ends of said reaction chamber;
   b) a plurality of solid reactant container means, each of which has a bottom out of which a gaseous material receiving chamber is cut and a porous floor that has an upper, solid reactant receiving surface, a lower, gaseous chamber surface that serves as a ceiling for the gaseous material receiving chamber and a plurality of passageways defined therein, the gaseous material receiving chamber being in fluid communication with the solid reactant material receiving surface via said passageways, said container means being in operative contact with the bottom of the tunnel and movable along its length;
   c) a means for moving said container means at least once through the reaction chamber of said tunnel;
   d) means for supplying gaseous materials to the gaseous material receiving chamber of each solid reactant container means while said container means are conveyed through the reaction chamber, said means for supplying gaseous materials being in fluid communication with a lower portion of the reaction chamber; and
   e) means for removing gaseous reaction products from the reaction chamber, said means for removing gaseous reaction products being in fluid communication with an upper portion of the reaction chamber.

2. The apparatus of claim 1 further comprising a first air lock and a second air lock, the first air lock being connected to, and in operative communication with, said first tunnel chamber at a point remote from the reaction chamber, said second air lock being connected to, and in operative communication with, said second tunnel chamber at a point remote from the reaction chamber.

3. The apparatus of claim 1 wherein the first tunnel chamber is connected to, and in fluid communication with, at least one conduit suitable for passage of gaseous materials.

4. The apparatus of claim 1 wherein the second tunnel chamber is connected to, and in fluid communication with, at least one conduit suitable for passage of gaseous materials.

5. The apparatus of claim 1 further comprising a means for preheating gaseous reactants before they are supplied to the container.

6. The apparatus of claim 1 wherein the means for moving said container means through the reaction chamber is a hydraulic pushing arm.

7. The apparatus of claim 1 wherein the means for moving said container means through the reaction chamber is a pneumatic pushing arm.

8. The apparatus of claim 1 wherein the bottom of the tunnel has defined therein a path which restricts side-to-side movement of said container means.

9. The apparatus of claim 1 wherein the gaseous material receiving chamber of the solid reactant container means has edges with form a frictional seal with the bottom of the tunnel sufficient to minimize loss of gaseous reactants.

* * * * *

UNITED STATES PATENT AND TRADEMARK OFFICE
CERTIFICATE OF CORRECTION

PATENT NO. : 5,112,579

DATED : May 12, 1992

INVENTOR(S) : David A. Dunn et al

It is certified that error appears in the above-indentified patent and that said Letters Patent is hereby corrected as shown below:

On the title page, under References Cited, U.S. Patent Documents, line 1, "1,103,092" should correctly read --1,030,929--.

under References Cited, U.S. Patent Documents, this should be added to the list --4,402,915 9/1983 Nishiyaki et al. .......422/202--

Column 16, line 60 "means has edges with form a frictional seal with the" should correctly read --means has edges which form a frictional seal with the--

Signed and Sealed this

Twenty-fourth Day of August, 1993

Attest:

BRUCE LEHMAN

*Attesting Officer*  *Commissioner of Patents and Trademarks*